(No Model.)

I. O. LITTLEFIELD.
TACK HOLDER FOR LASTS.

No. 562,631. Patented June 23, 1896.

John T. Bartlett,
David W. Whittier,
   Witnesses,

Irving O. Littlefield,
   Inventor,

UNITED STATES PATENT OFFICE.

IRVING O. LITTLEFIELD, OF RAYMOND, NEW HAMPSHIRE, ASSIGNOR OF ONE-HALF TO JOHN T. BARTLETT, OF SAME PLACE.

TACK-HOLDER FOR LASTS.

SPECIFICATION forming part of Letters Patent No. 562,631, dated June 23, 1896.

Application filed September 19, 1894. Serial No. 523,501. (No model.)

*To all whom it may concern:*

Be it known that I, IRVING O. LITTLEFIELD, a citizen of the United States, residing at Raymond, in the county of Rockingham and State of New Hampshire, have invented a new and useful Machine, of which the following is a specification.

My invention is a device for holding in place nails, brads, tacks, or any metal points by means of parallel metal wires pointed and contained in a metal tube, socket, or ferrule into which the aforesaid metal nails, brads, tacks, or points may be driven; and it consists of a metal tube, ferrule, or socket containing pointed parallel metal wires fastened to or into the metal back or end of the tube, socket, or ferrule, and held in place by said back or end and the sides of the tube, socket, or ferrule within which they are contained.

The device is intended, primarily, for a protection to lasts used in the manufacture of boots and shoes at those places in them where tacks and brads are driven to hold in place temporarily the different parts of the boots and shoes in process of manufacture. The tube, socket, or ferrule containing the pointed wires is let into the lasts with the pointed ends of the wires toward the surface, and the tacks or nails being driven into the open end of the tube, socket, or ferrule are held there by the pressure against them of the pointed wires, which are practically indestructible, so that by the use of this device lasts are rendered much more durable than without it. I attain these objects by the mechanism illustrated in the accompanying drawings, in which—

Figure 1:
Figure 2:
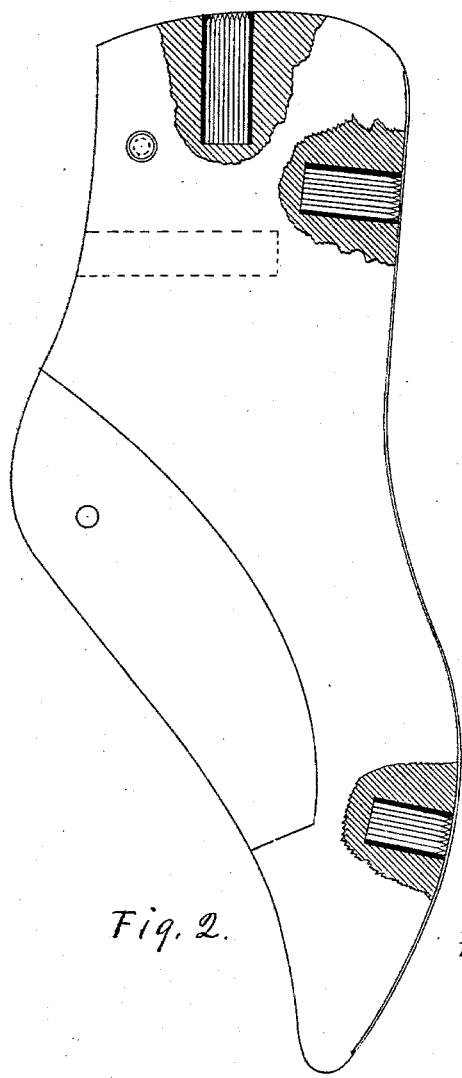
Figure 3:
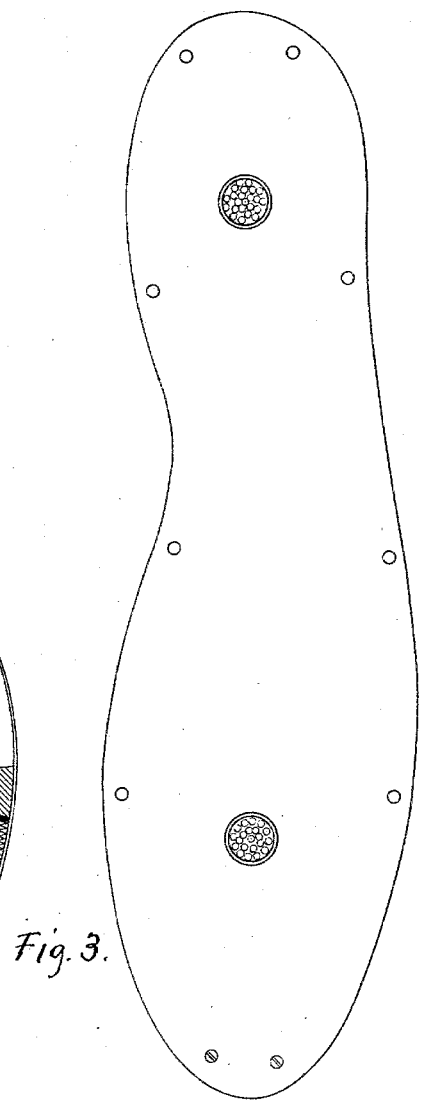

Figure 1 is an end view of the tube, socket, or ferrule containing the pointed parallel wires. Fig. 2 is a vertical section of a last containing the last-protectors in place, and Fig. 3 shows the protectors in place in the bottom of the last front view.

The tube, socket, or ferrule containing the parallel wires may be circular, square, or oblong in shape and the exposed end may be reamed out on the inside, so that the outside edge may be sharp. The outside surface of the tube, socket, or ferrule may have a thread cut upon it to hold it in place in the wood or other material, or it may be cut or scored for that purpose. The wires within the tube, socket, or ferrule are parallel with the sides thereof and are held in place by being soldered, brazed, headed, or swaged to or into the back or end of the tube, socket, or ferrule in which they are placed and by compression of the sides of the tube, socket, or ferrule.

What I claim as my invention, and desire to secure by Letters Patent, is—

A plug made entirely of metal consisting of pointed parallel wires, attached to, embedded in, or projecting from a metal back contained in a metal tube forming a retaining cushion or holder for receiving and holding in place tacks or brads, to be inserted in lasts at those places in them where tacks are driven into them to hold in place different parts of boots and shoes in process of manufacture.

IRVING O. LITTLEFIELD.

Witnesses:
JOHN T. BARTLETT,
DAVID W. WHITTIER.